United States Patent Office 3,697,370
Patented Oct. 10, 1972

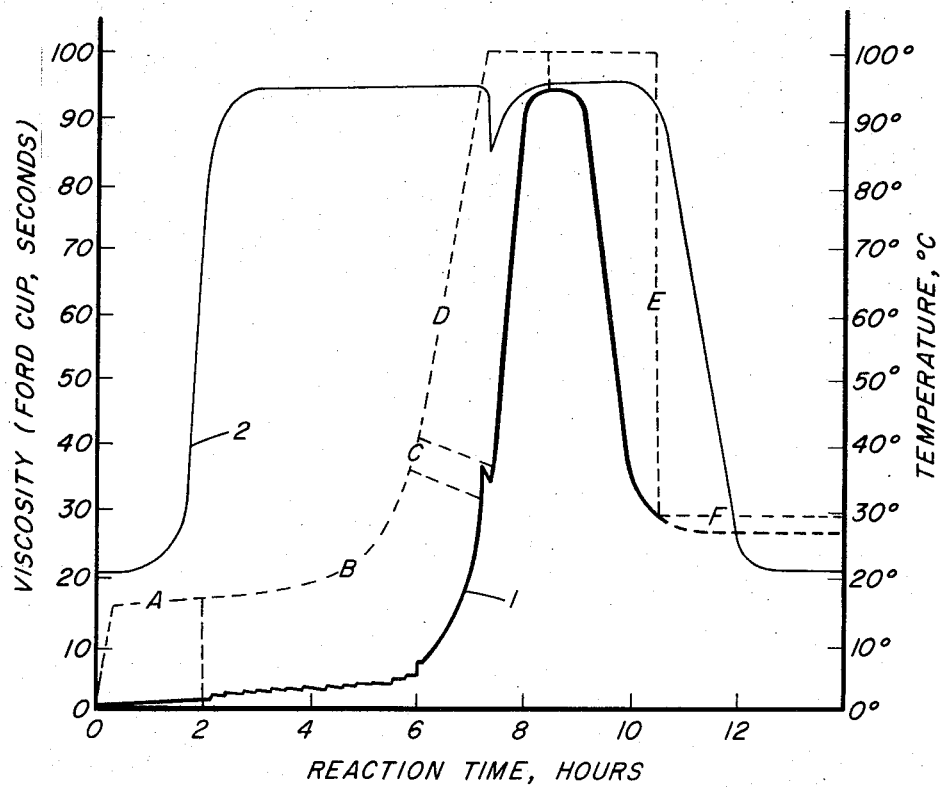

3,697,370
METHOD FOR MANUFACTURE OF DRY STRENGTH PAPER CONTAINING METHYLAMINE-EPICHLOROHYDRIN POLYMER
Daniel Elmer Nagy, Stamford, Conn., assignor to American Cyanamid Company, Stamford, Conn.
Application May 22, 1970, Ser. No. 39,874, which is a division of application Ser. No. 778,934, Nov. 26, 1968, now Patent No. 3,567,659. Divided and this application Dec. 8, 1970, Ser. No. 96,191
Int. Cl. D21h 3/38
U.S. Cl. 162—164    3 Claims

ABSTRACT OF THE DISCLOSURE

A cationic, water-soluble, storage-stable, methylamine-epichlorohydrin polymer is prepared by reacting a quantity of a methylamine-epichlorohydrin polymer which is well below its gel point with successively added small amounts of epichlorohydrin until the polymer nears the stage at which it is an irreversible gel, and then reacting the polymer with sufficient methylamine to inactivate substantially all amine reactive epichlorohydrin residues present. At least the last step of the reaction is performed at a temperature at which a particle depolymerization of the polymer occurs.

---

Water-soluble polymers of higher molecular weight and larger dimensions are produced by graft polymerizing one or more water-soluble vinyl monomers upon a hydrophilic water-dispersible cationic poly(hydroxyalkylene) polyamine, which is not necessarily the foregoing polyamine. The polymers are flocculants for suspended solids in sewage and mine effluent water and dry strength agents for paper.

This is a division of my copending application Ser. No. 39,874, filed on May 22, 1970, which is a division of my then copending application Ser. No. 778,934, filed on Nov. 26, 1968, now U.S. Pat. No. 3,567,659.

The present invention relates to hydrophilic, water-soluble or water-dispersible, cationic, storage-stable methylamine-epichlorohydrin condensation polymers, to water-soluble or water-dispersible cationic copolymers prepared by a graft polymerization of water-soluble vinyl monomers upon hydrophilic water-dispersible cationic poly (hydroxyalkylene) polyamines (including said methylamine-epichlorohydrin polymer), to the flocculation of suspended matter in aqueous media by the use of one or more of the aforesaid polymers, and to paper of improved strength prepared by use of one or more of the aforesaid polymers. The invention includes the processes as well as the compositions of matter involved.

The manufacture of paper which possesses dry strength alone, or both dry and wet strength, is a specialty of the paper making art, and new resins for these purposes are constantly desired.

A major advance in the foregoing art occurred when it was found that the water-soluble cationic polymer formed by reacting methylamine with epichlorohydrin in one step as disclosed and claimed in copending application Ser. No. 706,592, filed on Feb. 19, 1968 by A. T. Coscia, now U.S. Pat. No. 3,493,502, possessed the property of flocculating suspended solids in aqueous media and thereby increasing the speed with which such suspensions could be settled and filtered. This polymer is chemically unstable and sets to a gel unless at low pH.

It has now been discovered that the polymer which is obtained when methylamine is reacted with epichlorohydrin in accordance with the critical limitations hereinafter set forth, possesses in preferred embodiments the following preferred properties:

(1) It is stable indefinitely in aqueous medium at normal storage temperatures, up to at least 150° F.

(2) Each component of the polymer (the

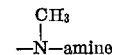

units and the —CH$_2$CH(OH)CH$_2$— hydroxypropylene units) is strongly hydrophilic so that the polymer is water-soluble when having a molecular weight up to 1,000,000 or more.

(3) It is an active substrate for ceric ion-catalyzed graft polymerizations, and long vinyl chains can be formed thereon. Graft polymers produced by this reaction are unusually effective flocculants and dry strength agents for paper.

The aforesaid stable methylamine-epichlorohydrin polymer is prepared by a process which comprises several steps.

In the first step, one mol of methylamine is reacted in aqueous alkaline solution with an amount of epichlorohydrin (0.8–0.9 mol) which is close to but safely (e.g., about 0.1 to 0.2 mol) short of the amount which would produce an irreversible gel. In this step sufficient time is allowed so that substantially all of the epichlorohydrin reacts bifunctionally with the methylamine. When performed in an open vessel the mixture is maintained at low temperature to prevent volatilization of methylamine, after which the temperature is allowed to rise to a temperature at which bifunctional reaction of epichlorohydrin goes to substantial completion.

In the second step the polymer is reacted at a pH above 8 with small amounts of epichlorohydrin (e.g., about 0.05–0.005 mol of epichlorohydrin per mol of methylamine originally taken) at spaced time intervals until the polymer has advanced close to the point of irreversible gelation. A sufficient interval of time (3 to 10 minutes) is allowed to elapse between the addition of each increment of epichlorohydrin so that each increment of epichlorohydrin reacts almost completely bifunctionally before the next increment is added, as evidenced by the viscosity of the solution becoming substantially constant between each addition. It is difficult to cause all of the epichlorohydrin to react bifunctionally and hence the polymer in this step contains a small amount of amine-reactive epichlorohydrin residues.

In the third step the epichlorohydrin substituents attached to the polymer (and any free epichlorohydrin in the solution) are inactivated by reaction with a water-soluble primary or secondary amine as polymerization terminator. The resulting polymer is storage-stable and is then ready for use.

The amine (hereinafter termed "amine terminator") also controls the extent of the depolymerization reaction, and if the amount of this amine is too large in any instance, the molecular weight of the polymer will be too low unless the reaction is quenched by cooling or otherwise in advance of complete reaction of the amine. The amount of amine needed in any instance depends upon the number of epichlorohydrin residues in the solution, the functionality of the amine (whether primary or secondary), and on the number of quaternized nitrogen atoms in the polymer. A suitable amount of amine is that which is sufficient to prevent the polymer from gelling during further heating or on storage. After addition of the amine the polymer solution is maintained at a depolymerization temperature at least until the polymer has become storage-stable. Further heating may cause additional depolymerization and is within the scope of the process.

The amount of amine terminator needed in any instance for one of these purposes cannot be readily calculated, but can be found by laboratory trial. In our work so far, 1 to 2 mol percent of the amine (based on the number of mols of epichlorohydrin taken) has been sufficient to prevent gelation and produce very satisfactory polymers which are storage-stable.

The depth of the decline in viscosity which occurs after attainment of maximum viscosity (section E) may be more or less than that shown in the drawing, depending on the amount of amine terminator added and length of time the solution is maintained at depolymerization temperature thereafter. With careful control of the amount of amine added and the duration of heating, it is possible to inactivate the epichlorohydrin residues and to terminate the polymerization reaction while the polymer solution is close to the gel point without significant subsequent decline in viscosity.

In most polymerizations which have a gel endpoint it is common practice to decrease the temperature of the reaction mixture as the gel point is approached so as to retard the rate of reaction when the viscosity is increasing most rapidly and thus permit the reaction to be safely terminated close to but short of the gel point. We have discovered, however, that in the reaction of the present invention the gel point can be safely approached at high temperature, provided that the temperature is sufficiently high. We have found that safe temperatures lie within the range of 70° C.–100° C.

The reason why temperatures in this range are safe has not been ascertained. We have established that heating the polymer at this temperature in the presence of amine terminator causes a depolymerization reaction which is generally sufficient to prevent passage of the polymer from water-soluble state into an irreversible gel state, and to convert any reversible gel which has formed back into water-soluble polymer state. The nature of the depolymerization reaction, however, has not been ascertained. From the fact that it causes a major decrease in viscosity of the polymer, often by 50% or more, we believe that the depolymerization reaction involves a scission of carbon-nitrogen quaternary ammonium bonds (i.e., scission of carbon bonds which are attached to quaternary ammonium nitrogen atoms), with consequent conversion of quaternary atoms to tertiary state and diminution in the number of cross-linkages in the polymer. The speed of the depolymerization reaction varies mainly with the pH of the solution and temperature, the depolymerization being favored by high pH and high temperatures. Suitable pH values and temperatures can be found by laboratory trial, employing the methods shown in the examples below. As a rule of thumb we have found that at about pH 9 a temperature of about 75° C. is satisfactory and that at about pH 8, a temperature of about 95° C. is satisfactory.

The depolymerization reaction, as far as we know, is not detrimental to the efficiency of the polymer as flocculant or as dry strength agent for paper. Its principal benefit is that it permits a high molecular weight, water-soluble, storage-stable polymer to be prepared close to its gel point while greatly decreasing the danger of formation of an irreversible gel, and facilitating the entire operation.

The product of the above-described process is largely composed of units of the formula

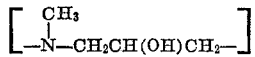

but may contain a small proportion of cross-linkages of undetermined formulae. The polymer is accordingly most conveniently described in terms of its method of preparation. For convenience it is sometimes hereinafter termed a poly(hydroxypropylene) poly(methylamine).

The aforesaid poly(hydroxypropylene) poly(methylamine) and the graft polymers thereof which are described herein below, in some instances form clear solutions when dissolved in water. In other instances, they form colloidal solutions, i.e., solutions which are iridescent or opalescent, resulting from the fact that the macromolecules therein are of colloidal or near-colloidal dimensions and either at or close to the borderline which exists between water-solubility and water-insolubility. For convenience, in the specification and the claims all these polymers are designated as "water-dispersible," it being understood that the term includes "water-soluble."

The reaction of the present invention tolerates the presence of other materials. Thus, up to about 20 mol percent of the methylamine can be replaced with other water-soluble primary amines, for example ethylamine, propylamine, ethanolamine, cyclohexylamine, etc. with substantially the same results, and the resulting polymers are within the scope of the present invention.

Suitable water-soluble amines for stopping the reaction are ethylamine, piperidine, diethylamine, ethanolamine, dimethylamine and methylamine itself. While secondary amines give better results methylamine gives satisfactory results and because of its prior use in the process, is preferred.

The effect of the depolymerization reaction is illustrated by the drawing, which represents a plot of the changes in viscosity (curve 1) and a plot of the changes in temperature (curve 2) which occur as a function of time when methylamine and epichlorohydrin are reacted in accordance with an embodiment of the invention in which the epichlorohydrin is added with about maximum rapidity. Curve 1 is divided into sections A–F, as shown by the lettered dotted lines.

In section A, 0.9 mol of epichlorohydrin is added to 1 mol of methylamine in a jacketed kettle provided with stirrer and reflux condenser over two hours. The temperature of the reaction mixture is controlled at 25° C. to minimize volatilization of methylamine, but at the end of the period is allowed to rise to 95° C. At the end of the second hour, sufficient acid acceptor solution (concentrated sodium hydroxide solution) is added to maintain the pH at above 8.5 during the remainder of the reaction. During most of this period the viscosity of the reaction mixture remains substantially constant. At the end of the period, reaction of the epichlorohydrin is substantially complete.

In section B, epichlorohydrin is added in increments of decreasing size, first of 0.01 mol and then of about 0.005 mol at intervals of about five minutes resulting in small stepwise increases in viscosity (shown schematically in drawing). At the end of the period of time covered by this section the viscosity of the reaction mixture rises almost vertically, and addition of epichlorohydrin is stopped.

At the start of section C, sufficient methylamine is added (1% based on the weight of the methylamine originally taken) to inactivate the amine-reactive epichlorohydrin substituents present and to inactivate any free (wholly unreacted) epichlorohydrin present, together with a quantity of cold water to slow the rate of viscosity increase. The mixture is heated back to 95° C. The methylamine reacts as reaction terminator, and the depolymerization reaction begins. The methylamine is added to provide an excess over the minimum needed to inactivate the epichlorohydrin residues. The methylamine does not react immediately, and the viscosity of the solution continues to climb. As a result of the depolymerization reaction and inactivation of the residual epichlorohydrin the climb stops at a viscosity of about 95 seconds, at which point the polymer is close to its gel point. In section E depolymerization is the only reaction which occurs, and the viscosity drops rapidly to about 30 seconds and levels off, as shown by the portion of the curve shown by dashes (section F). The solution is cooled to room temperature and is then ready for storage or use.

The solution obtained may be spray dried. The polymer is recovered as a free-flowing powder which dissolves readily in water. The solution obtained by dissolving the polymer in water possesses substantially all the properties of the solution prior to being spray dried.

The aforesaid polymer solution, as produced by the process outlined above, possesses desirable flocculating properties and is storage stable even though containing 20% polymer solids by weight and even though the polymer is of high molecular weight and close to the gel point. When used as a flocculant the polymer solution is advantageously diluted to 1%–5% concentration and is uniformly incorporated into the suspension to be clarified in amount sufficient to cause the suspended particles to coalesce and precipitate. The proper amount varies from instance to instance depending chiefly upon the zeta potential of the particles and the cationic charge of the polymer and is most conveniently found by trial on a sample of the suspension to be clarified. The polymer solution is effective for the flocculation of the suspended solids in sewage, mine effluent water and papermill white water. The pH of the suspension to be clarified is not critical and may be in the range of 4–10.

In the manufacture of paper the polymer is advantageously added to a papermaking furnish having a pH of 5–9, at the fan pump or similar location in an effective amount as dry strength agent. About 0.1% based on the dry weight of the fibers is about the least amount which produces a significant strengthening effect, and more than about 3% on the same basis does not produce commensurate increases in strength and so this amount is regarded as the practical maximum. The suspension is formed into paper in customary manner, and no special drying or other treatment is necessary. The product is paper composed of cellulose or other negatively-charged fibers bonded together by an adsorbed content of the polyamine.

Additionally I have found that valuable water-soluble cationic polymers of very high molecular weight, which may be thermosetting, are produced when a water-soluble poly(hydroxyalkylene) polyamine is graft polymerized by the ceric ion method of Mino et al. U.S. Pat. No. 2,922,768 with a water-soluble vinyl monomer or mixture of monomers. I have found that such graft polymers are thremosetting when the poly(hydroxyalkylene) polyamine used as the substrate for the graft polymerization is thermosetting. The polymers produced in this manner are useful as flocculants and as agents which improve the strength of paper. They are employed in the same manner as heretofore known polyamine agents.

The substrate polymers used for the preparation of the graft polymers of the present invention contain

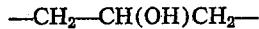

linkages and it is thought that the presence of —OH substituents in these linkages is the reason why the graft polymerization reaction proceeds with formation of such satisfactory products. The composition of the polymers is illustrated by the instance where the storage-stable methylamine-epichlorohydrin polymer of the present invention is the substrate; in that instance the graft polymer has the theoretical formula:

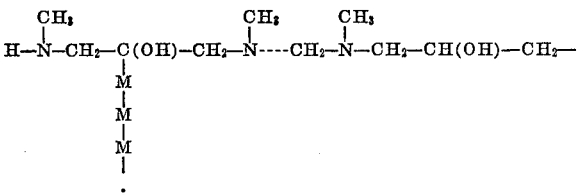

wherein the M's represent graft polymerized vinyl chains. It will be seen that the polymeric vinyl chains are attached to the same carbon atoms to which the —OH substituents are attached.

The vinyl monomers which can be graft copolymerized include vinyl amides such as acrylamide, methacrylamide, dimethyl aminoethyl methacrylate, and the like; vinyl acids such as acrylic and methacrylic acid; vinyl nitriles such as acrylonitrile, methacrylonitrile and the like, and esters such a methyl acrylate, methyl methacrylate, and mixtures of such vinyl monomers. Vinyl amides, particularly acrylamide, and mixtures of acrylamide with one or more of the monomers listed above, are preferable because they produce a product which is highly water-soluble, which possesses excellent flocculating properties, and excellent strengthening properties for cellulose papermaking fibers. Where the monomers are present, it is preferred that acrylamide be at least 75 mol percent of the mixture. In every instance where the graft polymer is not subjected to a solubilization treatment the proportions of water-soluble vinyl monomer in the polymerization mixture is such that the graft polymerization product is hydrophilic and water-dispersible as at least a colloid solution.

Acrylonitrile and other vinyl monomers which produce insoluble graft copolymer products can also be used to form the vinyl substituents of the graft copolymers of this invention in which event the graft polymer is subjected to a solubilization treatment. For example, when acrylonitrile alone is the vinyl monomer to be polymerized, the graft polymer may be insoluble in water and if insoluble the polymer can be solubilized by hydrolysis of nitrile groups with alkali.

The poly(hydroxyalkylene)polyamines are highly receptive to graft polymerization, and it is readily feasible to graft polymerize on the polyamine substrates a weight of vinyl monomer which is many times the weight thereof. However, when the weight of the grafted monomer is more than roughly 10 times the weight of the substrate the properties of the substrate nucleus tend to become masked and the properties of the polymer are predominantly those of the grafted vinyl material.

Reciprocally, when the amount of grafted material is less than roughly 1/10 the weight of the polyamine, the effect of the grafted material in altering the properties of the polyamine nucleus is not significant, and this is regarded as the practical minimum. In practice, then, the weight of the grafted vinyl material is between about 1/10 and 10 times the weight of the polyamine, and we prefer the intermediate range of 1/2 to 5 times the weight of the polyamine.

The ceric ion catalyst is essentially a dilute aqueous acidic solution of a water-soluble ceric salt. A 0.1 N solution of ceric ammonium nitrate, ceric sulfate, ceric ammonium sulfate, etc. in 1 N nitric acid is satisfactory. Only a small amount of ceric salt (from 1 to $10 \times 10^{-3}$ mol per mol of vinyl monomer) is needed and the polymerization proceeds at room temperature even in the presence of free (dissolved) oxygen. Very little homopolymerization occurs, and hence the amount of vinyl monomer which is grafted is usually above 90% of the amount supplied to the reaction mixture.

The poly(hydroxyalkylene)polyamines which are benefited by graft polymerization according to the present invention are water-soluble, preferably but not necessarily of high molecular weight, and have a substantial content of hydroxy-alkylene linkages. They may but need not be thermosetting, and, when thermosetting impart wet strength in addition to dry strength. Their molecular size may range from the size at which they are composed of a few monomeric units to several hundred thousand or more. At least 10 mol percent of the alkylene units connecting the amino nitrogen atoms should contain at least one hydroxyl substituent each.

Suitable poly(hydroxyalkylene)polyamines of the foregoing description include the water-soluble thermosetting polymers prepared by reacting ammonia with epichlorohydrin, by reacting a mixture of ammonia and a water-soluble alkylene-polyamine in 1:1 molar ratio with epichlorohydrin, by reacting a 6:1 molar ratio methylamine: ethylenediamine mixture with epichlorohydrin, by reacting methylamine and epichlorohydrin as disclosed in said copending application; by reacting a 1:1 molar ratio mixture of ammonia and guanidine with epichlorohydrin, and by reacting diethylenetriamine with epichlorohydrin. Detailed methods for the preparation of these and other poly(hydroxyalkylene)polyamines are disclosed in U.S. Pats. Nos. 2,585,935 and 2,595,936, and Coscia U.S. Pat. No. 3,248,353. Such polymers can be prepared in non-thermosetting state by inactivating any unreacted epichlorohydrin substituents present by adding dimethyl amine to the reaction mixture so that the polymerization process is halted before the polymer has reached the gel stage.

The graft copolymerization reaction using a methylamine-epichlorohydrin resin is carried out at an acid pH, preferably at a pH of about 3 to 5 and in the presence of sulfate ions. The pH of the reaction mass is initially adjusted to 5 or below before or immediately after addition of the catalyst. The pH is preferably maintained below 5 but above 3 during the remaining course of the graft polymerization reaction. It has been found that if the pH of the reaction mass is permitted to fall below 3, the conversion rate of the copolymerization reaction is significantly lowered.

The graft copolymers of this invention can be of any desired molecular weight so long as they are soluble or dispersible in aqueous medium, within the pH range of 4–10.

The viscosity of solutions of the graft copolymers of this invention can be reduced by the addition of small amounts of an alcohol, such as isopropanol, methanol, ethylene glycol, or propylene glycol. The viscosity-reducing agent is added to the reactants as disclosed in the accompanying examples.

Concentrated solutions of high molecular weight graft copolymers of this invention can be, in some instances, quite viscous, and may even take the form of firm gels. Such gels form mobile aqueous solutions or dispersions when stirred with several times their weight of water having a pH in the range of 4–10.

The process for preparing the graft copolymers of the present invention can be carried out at temperatures between about 10° C. and 90° C. and preferably at temperatures between about 25° C. and 55° C. Temperatures significantly above 80° C. are preferably avoided because the exothermic reaction may proceed too rapidly at these high temperatures, and lead to slightly less effective polymers.

While this process can be carried out under pressure or partial vacuum, if desired, atmospheric pressure operation has been found most satisfactory.

The cationic amine, graft copolymer removal agents can be added to the waste water system being treated in widely varying amounts, depending on the degree of waste removal desired in the system. The amount of removal agent added can also vary with the nature of the treatment system, that is, whether it is a primary or secondary treatment system, and with the permissible dwell time in the system.

The cationic copolymer removal agents can be added to the waste water system in amounts from about 0.001 to about 5 percent by weight of the dispersed solids. Preferably, concentrations of removal agent in the waste water system should be maintained between about 0.1 and 2 percent by weight of the suspended solids.

The invention is further illustrated by the examples which follow. These examples are preferred embodiments of the invention and should not be considered as limitations thereon.

EXAMPLE 1

The following illustrates a preferred method for the preparation of the methylamine epichlorohydrin polymer of the present invention.

To 100 g. of methylamine (3.25 mols) dissolved in 400 g. of water in a reaction flask provided with stirrer, thermometer and reflux condenser is added 260 g. of epichlorohydrin (2.8 mols, equivalent to 0.87 mol per mol of amine) over 60 minutes, cooling (by Dry Ice bath) being applied as necessary to keep the temperature of the reaction mixture between 25° C.–40° C. at the first half of the reaction and at 50° C.–80° C. during the second half of the reaction. 160 g. of 36% aqueous sodium hydroxide solution (1.44 mol) at 85° C. is then added to the reaction mixture. The reaction mixture is then heated to 95° C. and epichlorohydrin is added in 1 ml. ($\frac{1}{214}$ mol) portions and the viscosity of the reaction mixture is followed by filling a 6 mm. (inside diameter) vertical glass tube with the hot solution and noting the number of seconds required for the level of the solution to fall 13 inches when the bottom of the tube is opened. Results are as follows:

| Time (minutes)[1] | Ml. epichlorohydrin added | Temp., °C. | Viscosity (seconds)[2] |
|---|---|---|---|
| 110 | 1 | 95 | 4 |
| 115 | 1 | 95 | 5.5 |
| 123 | 1 | 95 | 10.0 |

[1] From start of reaction.
[2] Of reaction mixture, by glass tube method.

After 132 minutes, the reaction mixture becomes very viscous and the viscosity continues to rise. There is then added 274 g. of cold water containing 0.8 ml. of methylamine as reaction terminator, and the reaction mixture is heated to 94° C. The following viscosity changes occur:

| Time (minutes)[1] | Temp. (° C.) | Viscosity, seconds[2] |
|---|---|---|
| 157 | 94 | 48 |
| 220 | 94 | 90 |
| 250 | 94 | 120 |
| 310 | 94 | 136 |
| 345 | 94 | 125 |
| 605 | 94 | 60 |

[1] From start of reaction.
[2] Of reaction mixture by glass tube method.

The decrease in viscosity after 310 minutes is caused by scission of bonds within the polymer molecule.

The reaction mixture, which has a pH of 8.7, is cooled, acidified to pH 6.3, and diluted with water. The product contains 19.3% polymer and has a viscosity of 900 centipoises at 20° C.

The solution is stable indefinitely at 70° F. and 135° F. both at pH 8.7 and 4.5.

EXAMPLE 2

This illustrates the effectiveness of the polymer in Example 1 as flocculant.

The apparatus employed consists of a No. 2 Büchner funnel having its stem connected air-tightly to a volumetric cylinder through an adapter having a side-arm which is connected to a gauged vacuum source. A sheet of No. 2 Whatman filter paper is placed in the funnel over a wire-mesh screen support. For each test, a 300 ml. sample of sewage sludge (4.3% solids) is placed in a 400 ml. beaker. A 1% by weight solution in water of the polymer of Example 1 is measured into a similar beaker. The sludge is then poured into the polymer solution and the mixture is poured back and forth between the beakers three times to ensure complete mixing. The resulting mixture (a "conditioned" sludge) is then poured into the Büchner funnel (the filter paper in the funnel having been previously moistened and applied under vacuum to form a seal). After 5–10 seconds (to permit turbulence to cease) 30″ of vacuum is applied to the funnel and the time required for 100 ml. of filtrate to pass through the filter is recorded. The test is repeated, the polyamide being replaced by a laboratory standard flocculant (flocculant C–31 of the Dow Chemical Co.) as control.

The filtration rate of the sludge treated with the polymer of the present invention is about twice as fast (2.04 times) as that of the control.

EXAMPLES 3-6

This series of examples shows the effect of variations in the amount of alkali added to the reaction mixture.

The general procedures of Examples 1 and 2 are repeated with variations as follows.

Example 3: Addition of the sodium hydroxide solution is commenced when 34% of the epichlorohydrin has been added and is completed in 1.6 hours. The remaining 66% of the epichlorohydrin is added over two hours starting with the addition of the sodium hydroxide solution. The solution is then heated to 79° C. After the odor of epichlorohydrin has disappeared from the solution, during the next four hours, a total of 27 g. of epichlorohydrin is added to the reaction mixture in 1 g. portions. The viscosity of the solution is allowed to become constant between each addition. At the beginning of the four-hour period, the viscosity is such that one second is required for the solution to descend 13 inches in the glass tube. At the end of the fourth hour 7 seconds are required, and no more epichlorohydrin is added. The viscosity climbs as follows.

| Minutes after last addition of epichlorohydrin | Temp., °C. | Viscosity (seconds) [1] |
|---|---|---|
| 0 | 76 | 7 |
| 10 | | 10 |
| 35 | | 15 |
| 40 | | 17 |
| 60 | | 25 |
| 65 | | 30 |
| 100 | 77 | 39 |
| 110 | | 42 |
| 160 | | 50 |
| 245 | 75 | 100 |
| 285 | 77 | 95 |
| 430 | 77 | 88 |
| 522 | 77 | 85 |
| 582 | 77 | 83 |

[1] Of hot solution, by glass tube method.

After 110 minutes the viscosity is increasing rapidly and gelation begins. At this time 125 ml. of cold water and 3.7 g. of 40% methylamine are added and the reaction mixture is reheated and held at 75° C. After 245 minutes gelation is reversed and the viscosity of the solution falls, owing to scission of bonds in the polymer molecule and consequent depolymerization.

After 582 minutes the heating is discontinued. The resulting polymer is cooled and is storage-stable.

Examples 4-6: The general procedure of Example 3 is followed with the following exceptions: (1) different amounts of alkali are used as recorded in the table below, and (2) the temperature of the reaction mixture is maintained at 90° C. during the incremental addition of 1 g. portions of epichlorohydrin. In Example 6 alone, the alkali is added concurrently with the epichlorohydrin from the beginning of the reaction.

The polymers prepared in Examples 3-6 are evaluated as sewage flocculants according to the procedures outlined in Example 2. Results are as follows:

| Example: | Mols NaOH added | Mols epichlorohydrin reacted [1] | Soln. pH [2] | Flocculant efficiency of polymer [3] |
|---|---|---|---|---|
| 3 | 0.525 | 0.965 | 8.55 | Sl. better. |
| 4 | 0.600 | 0.965 | 8.55 | Do. |
| 5 | 0.810 | 1.02 | 9.05 | Do. |
| 6 | 0.900 | 1.18 | 9.0 | Do. |

[1] Per mol of methylamine.
[2] After addition of epichlorohydrin.
[3] Based on filtration rate produced by laboratory standard flocculant.

EXAMPLE 7

The following illustrates th storage stability of a solution of the methylamine-epichlorohydrin polymer at the solids content at which it is normally prepared, at various temperatures and pH values. The samples stored at the temperatures shown and are observed from time to time. Results are as follows:

| pH | Temp., °C. | Viscosity after 12 mos. |
|---|---|---|
| 1.3 | 25 | No change. |
| 3.3 | 25 | Do. |
| 7.0 | 25 | Do. |
| 1.6 | 50 | Do. |
| 3.1 | 50 | Do. |
| 9.0 | 50 | Do. |

The results indicated that the polymer is stable indefinitely.

EXAMPLE 8

An aqueous solution corresponding to that prepared in Example 1 containing 20% polymer by weight and having a pH of 6.3 is fed into a laboratory spray drier at the rate of 50 ml. of solution per minute under conditions such that the inlet air temperature of the drier is 400° F. and the outlet air temperature is 150° F. The size of the sprayed particles and the duration of the drying are such that the product contains 5% moisture by weight and flows freely when poured from a container.

The product is a free-flowing powder which dissolves rapidly in water forming an opalescent solution therein. The resulting solution possesses substantially the same efficiency as flocculant and as dry strength agent for paper as the parent solution.

EXAMPLE 9

The following illustrates the ease with which the polymer of the present invention undergoes graft polymerization with acrylamide to form a polymer of high molecular weight. The ratio of the polymer to the acrylamide is 1:1 by weight.

To 85.6 g. of a 23.6% by weight aqueous solution of the water-soluble, stable cationic polymer of Example 1 having a viscosity of 244 centipoises at 25° C. are added consecutively 50 ml. of water, enough 50% $H_2SO_4$ to lower the pH to 4.8, 20 g. of acrylamide, 4 ml. of isopropyl alcohol and sufficient water to increase the weight of the solution to 188 g.

To this is quickly added with stirring 12 ml. of ceric catalyst solution, prepared by mixing ceric ammonium nitrate and concentrated nitric acid in water to yield a solution 0.1 N with respect to ceric ion and 1 N with respect to nitric acid, as disclosed in said Mino et al. patent.

The temperature of the reaction mass rises to 52° C. approximately one minute after addition of the ceric solution, and the solution reaches a high viscosity in the first two minutes.

After standing overnight, the final pH of the reaction mass is about 3.2 and the aqueous solution of the graft copolymer product has a viscosity of 70,000 centipoises at the concentration of 20% active solids, which indicates that the molecular weight of the graft polymer is in excess of 1,000,000.

EXAMPLES 10-12

The following shows how the viscosity (and therefore molecular weight) of the graft copolymer can be controlled by varying the amount of alcohol.

The procedure of Example 9 is repeated except that the amount of isopropyl alcohol added is varied as shown in the table below. The results show that the molecular weight of the graft copolymer decreases as the amount of alcohol increases. The viscosities were determined on the final solution at uniform solids content and at 25° C.

| | Ml. iso-propanol | Viscosity (cp.) of polymer |
|---|---|---|
| Example: | | |
| 10 | 2 | 120,000 |
| 11 | 6 | 29,000 |
| 12 | 20 | 5,500 |

EXAMPLE 13

The following illustrates the preparation of a polymer similar to that of Example 9, except that the weight ratio of the polymers is 3:1.

To 83.5 g. of a 24% solution of a methylamine epichlorohydrin polymer prepared by the method of Example 1 having a viscosity of 500 centipoises are added consecutively sufficient 50% sulfuric acid to adjust the pH to 5.4, 60 g. of acrylamide, sufficient water to increase the weight of the solution to 400 g., and 24 ml. of the 0.1 N ceric solution of Example 9 in one portion with stirring. An exothermic reaction occurs, and the solution becomes a firm gel having a final pH of 4.1. Water is added and the gel is stirred slowly. The gel dissolves. The resulting solution is diluted with water to 3% polymer solids content by weight and the resulting solution is viscous.

This solution is highly efficient as a sewage flocculant. In comparative tests, it is found that the optimum amount of the product of this example needed for effective sewage solids removal is only 75% of the amount required of a commercial sewage flocculant. Further, water can be filtered through the sludge produced by the graft copolymer of this example three times as fast as it can be filtered through the sludge treated with the commercial flocculant.

EXAMPLE 14

This illustrates the hydrolysis of an acrylamide-grafted polyamine of the present invention to produce a polyampholyte containing carboxy groups.

The procedure of Example 13 is repeated except that the amount of acrylamide is increased to 100 g. (5:1 acrylamide:polyamine ratio). The starting graft polymer is a firm gel which is dissolved by slowly stirring into water at 95° C. containing 2 mols of sodium hydroxide per mol of combined acrylamide taken.

After 6 hours the mixture is a viscous solution which is dilutable with water, but which precipitates when acidified.

EXAMPLE 15

The procedure of Example 13 is again repeated except that 20 g. of acrylamide is used (1:1 acrylamide:polymer ratio). After the alkaline hydrolysis, the resinous copolymer product is soluble in water but precipitates when the pH is lowered to about 5.0. The precipitated resin is redissolved almost completely when excess acid is added.

EXAMPLE 16

The following illustrates the preparation of a polymer according to the present invention wherein the backbone is polyacrylonitrile.

To 100 g. of a 20% solution of methylamine-epichlorohydrin cationic polymer having a viscosity of 504 cp. at 25° C. is added sufficient 50% $H_2SO_4$ to decrease the pH of the solution to 3.9 and sufficient water to produce a total solution weight of 1300 g. The solution is sparged with nitrogen and 100 g. of acrylonitrile is added, followed by 15.5 ml. of the 0.1 N ceric solution of Example 9. Immediately after addition of the ceric solution, the reaction mixture warms and becomes cloudy and whitish, and thickens. After standing overnight, the resinous reaction product is added slowly to 118 g. of sodium hydroxide in 1 liter of water at 95° C. Hydrolysis occurs with formation of carboxyl groups, as shown by the product becoming soluble in water. The resulting red solution becomes colorless and homogenous in about 2 hours. It is held at 95° C. for a total of six hours. A precipitate forms when the clear homogenous solution is acidified.

EXAMPLE 17

The following illustrates the grafting of acrylamide and methylenebisacrylamide upon a polyamine of the present invention.

To 432 g. of diethylenetriamine in 161 g. of water at 92° C. is added 430 g. of epichlorohydrin over a period of 2.5 hours. The solution becomes viscous and is diluted with water containing 100 ml. of 10 N sulfuric acid to yield a final solution comprising 1462 g. of amine resin (48.2% of the weight of the solution). 41.5 g. is diluted to 20% solids by addition of water, the pH of the solution is adjusted to 2.5 with sulfuric acid, and 20 g. of acrylamide and 40 ml. of a 0.1% by weight solution of methylenebisacrylamide are added. To this solution is added 5 ml. of the 0.1 N ceric nitrate solution of Example 9, and the solution sets to a water-soluble gel almost immediately.

The solution is an effective flocculant for the solids in sewage.

EXAMPLE 18

The procedure of Example 17 is repeated except that only 20 ml. of the 0.1% methylenebisacrylamide solution is used. The resulting copolymer resin solution thickens but does not gel. The product is a flocculant but is considerably less so than the polymer of Example 17.

EXAMPLE 19

A water-soluble polyamidepolyamine is prepared by condensing adipic acid and diethylenetriamine in 1:1 molar ratio, and 0.3 mol of epichlorohydrin is bifunctionally reacted therewith. The resulting condensate is mixed with equal parts by weight of acrylamide and water added to dilute to 20% solids. Ceric nitrate catalyst solution is added to catalyze the graft copolymerization reaction as shown in Example 9. A high viscosity polymer results. This polymer is a dry strength agent for paper.

EXAMPLE 20

The procedure of Example 9 is repeated except that 20 g. of acrylamide+1 g. of acrylic acid are substituted for the acrylamide used to form the vinyl substituent.

The graft copolymer is an effective precipitant for the dispersed solids in sewage.

EXAMPLE 21

The procedure of Example 9 is followed except that 20 g. of acrylamide+1 g. of dimethylaminoethylmethacrylate are substituted for the acrylamide used to form the vinyl substituent.

The graft copolymer is an effective precipitant for the dispersed solids in sewage.

EXAMPLE 22

The procedure of Example 10 is followed except that 15 g. methylacrylic acid are substituted for the acrylamide used to form the vinyl substituent.

EXAMPLE 23

The following illustrates how the viscosity of the graft copolymer products of this invention and therefore the molecular weight of the product is affected by changes in the initial pH of the reaction mixture. The materials used and the procedure followed are essentially the same as those of Example 9, above, except that no isopropyl alcohol is used. Results are as follows:

| | pH during polymerization [1] | Viscosity of 5% solution [2] |
|---|---|---|
| Run: | | |
| A | 4.4 | 1,500 |
| B | 4.0 | 730 |
| C | 3.5 | 525 |
| D | 3.1 | 470 |
| E | 2.6 | 340 |
| F | 2.0 | 150 |
| G | 1.55 | 112 |

[1] Based on pH immediately after polymerization. The results show that the molecular weight of the graft polymer falls off sharply when the pH of the reaction mixture is allowed to fall below 4.
[2] Of reaction product.

EXAMPLE 24

The cationic amine-containing graft copolymers produced by runs A, D, and G of Example 23 and the parent poly(hydroxyalkylene)polyamine are evaluated as sewage precipitants as described in Example 2. The results of these runs show that the reaction products of this invention are highly effective precipitants for the dispersed solids in sewage, despite major differences in their molecular weight. Results are as follows:

| Polymer | pH during polymerization | Filtration rate of sludge [1] |
|---|---|---|
| A | 4.4 | 7.6 |
| D | 3.1 | 8.3 |
| G | 1.55 | 2.2 |

[1] Based on filtration rate (taken as 1) of sludge treated with laboratory control flocculant.

The results show that the graft polymer produced at pH 3.1 produced a sludge which filtered 8.3 times as fast as the sludge treated with the laboratory control flucculant.

EXAMPLE 25

The following illustrates the manufacture of paper of improved strength by the use of graft polymers of the present invention.

The polymers are prepared by the method of Example 23, except that the pH values of the solution during the graft polymerization is as shown in the table.

| Polymer | pH during polymerization | Viscosity of 5% soln. (cp.) |
|---|---|---|
| A | 5.05 | 320 |
| B | 2.3 | 112 |
| C | 1.9 | 70 |
| D | 1.1 | 56 |

The dry strength properties of the polymer are determined by standard laboratory method, wherein the polymers are added to a dilute suspension of cellulose papermaking fibers at pH 6. The suspension is formed into a web at 100 lb. basis weight (25" x 40"/500 ream) on a handsheet machine, the handsheet is dried for two minutes on a laboratory rotary drum drier having a drum temperature of 240° F. and dry strength is determined by Mullen burst.

Results are as follows:

| Run | Number | pH during graft polymer | Visc. of 5% soln. | Percent polymer | Burst Lb. | Percent increase |
|---|---|---|---|---|---|---|
| 1 | | | | None | 40.6 | |
| 2 | A | 5.05 | 320 | 0.5 | 58.1 | 43.1 |
| 3 | B | 2.3 | 112 | 0.5 | 57.1 | 39.6 |
| 4 | C | 1.9 | 70 | 0.5 | 57.1 | 39.6 |
| 5 | D | 1.1 | 56 | 0.5 | 52.8 | 30.0 |

The results show that the strength-imparting efficiency of the graft polymer increases sharply as its molecular weight rises.

EXAMPLE 26

This example illustrates a process for preparing the graft copolymers of this invention in which the vinyl monomer and the ceric catalyst solution are incrementally added to the solution of the cationic amine-containing polymer to permit convenient regulation of the pH and the rate of the exothermic reaction. To 171 g. of the 23.0% solution of methylamine-epichlorohydrin condensate of Example 1 in a flask equipped with sparger, stirrer, thermometer and three dropping funnels are added 40 ml. of water and the solution is acidified to pH 4.05 with 50% aqueous $H_2SO_4$. The resulting solution is sparged with nitrogen.

Into the funnels are respectively placed 40 g. of acrylamide and 60 ml. of water; 24 ml. of the 0.1 ceric catalyst solution of Example 1 and 26 ml. of water; and 10 ml. of 10% aqueous NaOH solution. One tenth of the ceric catalyst solution and one-tenth of the acrylamide are first added while continuing the nitrogen sparge. After about 10 minutes, 1 ml. of the NaOH solution is added and then another one-tenth portion of the acrylamide and ceric are added, followed by another 1 ml. of sodium hydroxide. This sequence is repeated until all the materials have been added.

The amount of alkali added is regulated to keep the pH at 3.4. The final solution has a viscosity of 272,000 centipoises at 20% polymer solids, indicative of a polymer having a molecular weight of more than 1,000,000. Less viscous solutions can be prepared by the procedure of this example by adding small amounts of isopropyl alcohol to the reaction mixture.

The invention in its broader aspects is not limited to the specific details shown and described, and departures may be made from such details without departing from the principles of the invention and without sacrificing its chief advantages.

I claim:

1. Paper of improved strength composed of negatively charged papermaking fibers having a uniformly absorbed content of a polymer prepared by substantially completely reacting in aqueous alkaline solution 1 mol of a methylamine with epichlorohydrin in sufficient amount between 0.8 and 1.2 mol to produce a polymer which is cationic and water-dispersible; reacting said polymer successively, substantially but not completely, with increments of epichlorohydrin each less than about 0.1 mol per mol of said methylamine at a pH about 8 until the polymer is close to but short of the point at which it becomes an irreversible gel whereby said polymer contains a small number of amine-reactive epichlorohydrin residues; adding to the resulting solution sufficient of a water-soluble primary or secondary amine to prevent said polymer from gelling during further heating and on storage; and maintaining the resulting solution at a depolymerization temperature at least until the polymer therein has become storage-stable.

2. Process for the manufacture of paper of improved strength which comprises adding an effective amount as dry strengthening agent of a polymer according to claim 1 to an aqueous suspension of cellulose papermaking fibers having a pH of 5–9, forming the suspension into a web, and drying the web to form paper.

3. Process for the manufacture of paper which comprises adding an effective amount as dry strengthening agent of a polymer according to claim 1 which has been graft polymerized with between 1/10 and 10 times its weight of a water-soluble vinyl monomer in the presence of a ceric graft polymerization catalyst, to an aqueous suspension of cellulose papermaking fibers having a pH of 5-9, forming the suspension into a web, and drying the web to form paper.

References Cited

UNITED STATES PATENTS

| | | | |
|---|---|---|---|
| 2,753,372 | 7/1956 | Lundberg | 162—164 X |
| 3,248,353 | 4/1966 | Coscia | 162—164 X |
| 3,269,890 | 8/1966 | Gaertner | 162—164 |
| 3,314,897 | 4/1967 | Gaertner | 162—164 X |
| 3,493,502 | 2/1970 | Coscia | 210—54 |

S. LEON BASHORE, Primary Examiner

F. Frei, Assistant Examiner

U.S. Cl. X.R.

162—168

UNITED STATES PATENT OFFICE
CERTIFICATE OF CORRECTION

Patent No. 3,697,370          Dated October 10, 1972

Inventor(s) Daniel Elmer Nagy

It is certified that error appears in the above-identified patent and that said Letters Patent are hereby corrected as shown below:

Column 6, line 67, "aminonitrogen" should read -- amino-nitrogen --. Column 8, line 3, "(by Dry Ice" should read --(by ice--. Column 9, line 65, second table, second column, "0 900" should read -- 0.900 --; Column 9, line 72, "th" should read -- the --.

Signed and sealed this 27th day of March 1973.

(SEAL)
Attest:

EDWARD M. FLETCHER, JR.          ROBERT GOTTSCHALK
Attesting Office          Commissioner of Patents